(12) United States Patent
Nam et al.

(10) Patent No.: US 10,103,857 B2
(45) Date of Patent: Oct. 16, 2018

(54) SIGNALING METHODS AND APPARATUS FOR ADVANCED MIMO COMMUNICATION SYSTEMS

(71) Applicant: Samsung Electronics Co., Ltd, Suwon-si (KR)

(72) Inventors: Young-Han Nam, Plano, TX (US); Md. Saifur Rahman, Richardson, TX (US); Boon Loong Ng, Plano, TX (US); Eko Onggosanusi, Allen, TX (US); Youngwoo Kwak, Suwon-si (KR); Hoondong Noh, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 15/238,684

(22) Filed: Aug. 16, 2016

(65) Prior Publication Data

US 2017/0078065 A1 Mar. 16, 2017

Related U.S. Application Data

(60) Provisional application No. 62/219,454, filed on Sep. 16, 2015, provisional application No. 62/233,011, (Continued)

(51) Int. Cl.
*H04L 5/00* (2006.01)
*H04B 7/0413* (2017.01)

(52) U.S. Cl.
CPC ......... *H04L 5/0048* (2013.01); *H04B 7/0413* (2013.01)

(58) Field of Classification Search
CPC .... H04L 5/0048; H04B 7/0413; H04W 72/02; H04W 72/044; H04W 72/0406
(Continued)

(56) References Cited

U.S. PATENT DOCUMENTS

| | | |
|---|---|---|
| 2014/0079149 A1 | 3/2014 | Lee et al. |
| 2014/0192917 A1 | 7/2014 | Nam et al. |

(Continued)

FOREIGN PATENT DOCUMENTS

| | | |
|---|---|---|
| EP | 3125438 A1 | 2/2017 |
| WO | 2017039166 A1 | 3/2017 |
| WO | 2017095000 A1 | 6/2017 |

OTHER PUBLICATIONS

3GPP TSG-RAN WG1#82; WF on FD-MIMO codebook; Samsung, ZTE, ALU, ASB, Ericsson, CATT ; Beijing, China, Aug. 24-28, 2015—7 Pages.

(Continued)

*Primary Examiner* — Obaidul Huq

(57) ABSTRACT

A user equipment (UE) capable of communicating with a base station (BS) includes a transceiver configured to receive a signal comprising a CSI process configuration, wherein the CSI process configuration comprises a CSI-RS resource configuration to identify a plurality of CSI-RS resources, each CSI-RS resource configured with the number of antenna ports, and a controller configured to derive a CSI-RS resource indicator (CRI) by utilizing the CSI-RS, wherein the transceiver is further configured to transmit the CRI to the base station, and wherein when the number of antenna ports in each configured CSI-RS resource is one (1), reporting instances for the CRI are subframes satisfying an equation specified in the disclosure. The corresponding base station and method are also disclosed.

20 Claims, 9 Drawing Sheets

Related U.S. Application Data filed on Sep. 25, 2015, provisional application No. 62/251,384, filed on Nov. 5, 2015.

(58) Field of Classification Search
USPC .......................................... 370/310, 328, 329
See application file for complete search history.

(56) References Cited

U.S. PATENT DOCUMENTS

| | | |
|---|---|---|
| 2014/0241274 A1 | 8/2014 | Lee et al. |
| 2015/0009928 A1 | 1/2015 | Sohn et al. |
| 2016/0277954 A1* | 9/2016 | Frenne .................. H04L 5/0053 |
| 2017/0063503 A1* | 3/2017 | Liu ....................... H04L 5/0048 |

OTHER PUBLICATIONS

ETSI TS 136 211 v12.6.0 LTE; Evolved Universal Terrestrial Radio Access (E-UTRA); Physical channels and modulation (3GPP TS 36.211 version 12.6.0 Release 12) Jul. 2015—138 Pages.

ETSI TS 136 212 v12.5.0 LTE; Evolved Universal Terrestrial Radio Access (E-UTRA); Multiplexing and channell coding (3GPP TS 36.212 version 12.5.0 Release 12) Jul. 2015—96 Pages.

ETSI TS 136 213 v12.6.0 LTE; Evolved Universal Terrestrial Radio Access (E-UTRA); Physical layer procedures (3GPP TS 36.213 version 12.6.0 Release 12) Sep. 2015—242 Pages.

The International Searching Authority, "International Search Report," Application No. PCT/KR2016/010334, dated Dec. 20, 2016, 3 pages, publisher The ISA/KR, International Application Division, Korean Intellectual Property Office, Daejeon, Republic of Korea.

The International Searching Authority, "Written Opinion," Application No. PCT/KR2016/010334, dated Dec. 20, 2016, 6 pages, publisher The ISA/KR, International Application Division, Korean Intellectual Property Office, Daejeon, Republic of Korea.

Cati et al., "CS I-Process Reporting Cl ass B for EB/FD-MIMO," RI-154902, 3GPP TSG-RAN WG1 Meeting #82, Beijing, China, Aug. 24-28, 2015, Aug. 30, 2015, 5 pages.

LG Electronics et al., "WF on configurable parameters for CIS reporting class B," RI-154994, 3GPP TSG RAN WG1 Meeting #82, Beijing, China, Aug. 24-28, 2015, Aug. 30, 2015, 6 pages.

Extended European Search Report regarding Application No. 16846870.0, dated Aug. 2, 2018, 11 pages.

Onggosanusi, "Elevation Beamforming/Full-0imention (FD) MIMO for LTE", 3GPP TSG RAN Meeting #69, RP-151391, Sep. 2015, 8 pages.

ZTE, "Discussion on CSI Process and CSI-RS Resource Definitions", 3GPP TSG RAN WG1 Meeting #82, R1-154378, Aug. 2015, 6 pages.

\* cited by examiner

FIGURE 4A 16 PORT Config A
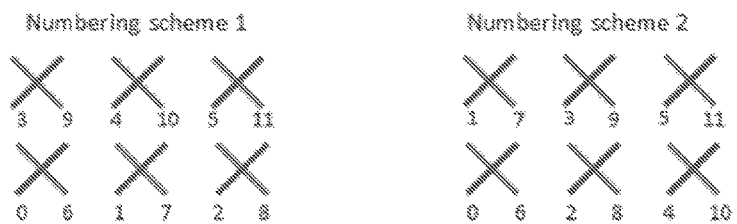
FIGURE 4C 12 PORT Config A
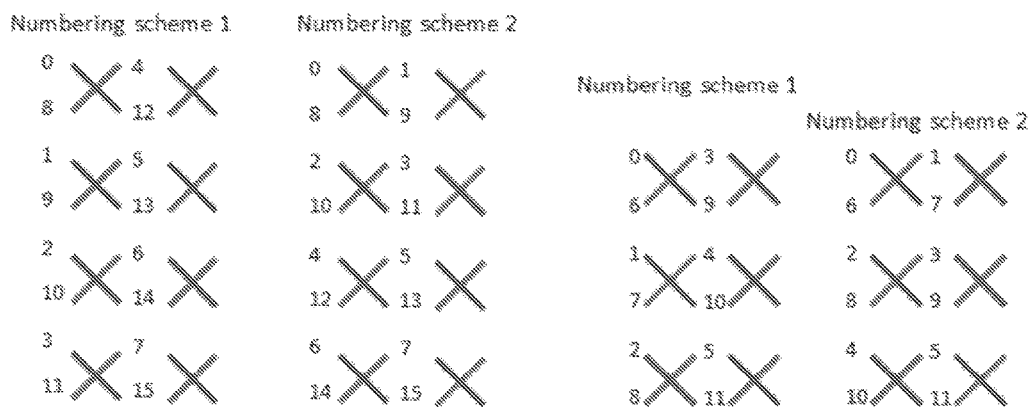
FIGURE 4B 16 PORT Config B
FIGURE 4D 12 PORT Config B

SIGNALING METHODS AND APPARATUS FOR ADVANCED MIMO COMMUNICATION SYSTEMS

CROSS-REFERENCE TO RELATED APPLICATION AND CLAIMS OF PRIORITY

This application claims priority under 35 U.S.C. § 119(e) to U.S. Provisional Patent Application No. 62/219,454 filed on Sep. 16, 2015; U.S. Provisional Patent Application No. 62/233,011 filed on Sep. 25, 2015; U.S. Provisional Patent Application No. 62/251,384 filed on Nov. 5, 2015. The above-identified provisional patent applications are hereby incorporated by reference in their entirety.

TECHNICAL FIELD

The present disclosure relates generally to MIMO wireless communication systems and in particular to advanced feedback and reference signal transmissions for MIMO wireless communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In a first embodiment, a user equipment (UE) capable of communicating with a base station (BS) includes a transceiver configured to receive a signal comprising a CSI process configuration, wherein the CSI process configuration comprises a CSI-RS resource configuration to identify a plurality of CSI-RS resources, each CSI-RS resource configured with the number of antenna ports, and a controller configured to derive a CSI-RS resource indicator (CRI) by utilizing the CSI-RS, wherein the transceiver is further configured to transmit the CRI to the base station; and wherein when the number of antenna ports in each configured CSI-RS resource is one (1), reporting instances for the CRI are subframes satisfying:

$$(10 \times n_f + \lfloor n_s/2 \rfloor - N_{OFFSET,CQI} - N_{OFFSET,CRI}) \mod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer.

In a second embodiment, a base station capable of communicating with a user equipment (UE) includes a transmitter configured to transmit a signal comprising a CSI process configuration, wherein the CSI process configuration comprises a CSI-RS resource configuration to identify a plurality of CSI-RS resources, each CSI-RS resource configured with the number of antenna ports, a receiver configured to receive a CSI-RS resource indicator (CRI) derived by utilizing the plurality of CSI-RS resources, wherein when the number of antenna ports in each configured CSI-RS resource is one (1), reporting instances for the CRI are subframes satisfying:

$$(10 \times n_f + \lfloor n_s/2 \rfloor - N_{OFFSET,CQI} - N_{OFFSET,CRI}) \mod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer.

In a third embodiments, A method for communicating with a base station (BS) includes transmitting a signal comprising a CSI process configuration, wherein the CSI process configuration comprises a CSI-RS resource configuration to identify a plurality of CSI-RS resources, each CSI-RS resource configured with the number of antenna ports, receiving a CSI-RS resource indicator (CRI) derived by utilizing the plurality of CSI-RS resources, wherein when the number of antenna ports in each configured CSI-RS resource is one (1), reporting instances for the CRI are subframes satisfying:

$$(10 \times n_f + \lfloor n_s/2 \rfloor - N_{OFFSET,CQI} - N_{OFFSET,CRI}) \mod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A through 4D illustrate example 2D antenna arrays comprising 12 or 16 dual-polarized antenna elements according to this disclosure;

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: (1) 3rd generation partnership project (3GPP) TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

Figure 1:
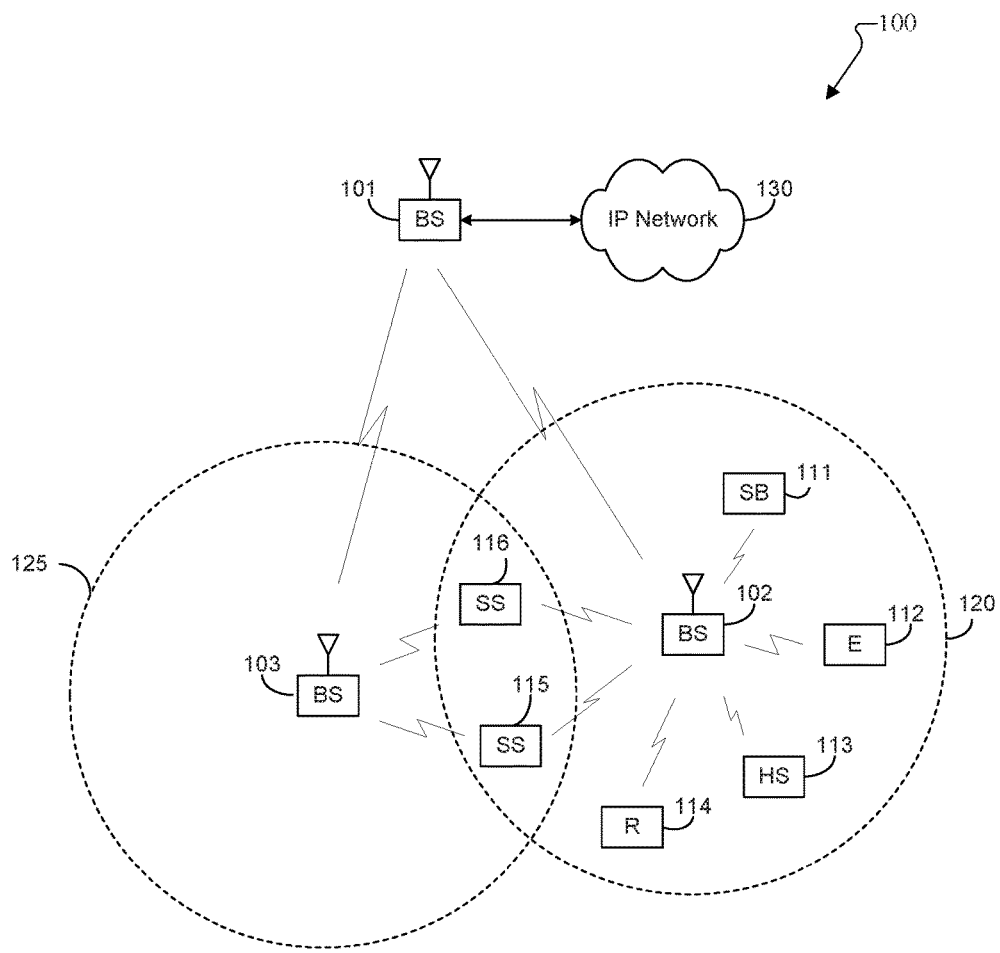
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
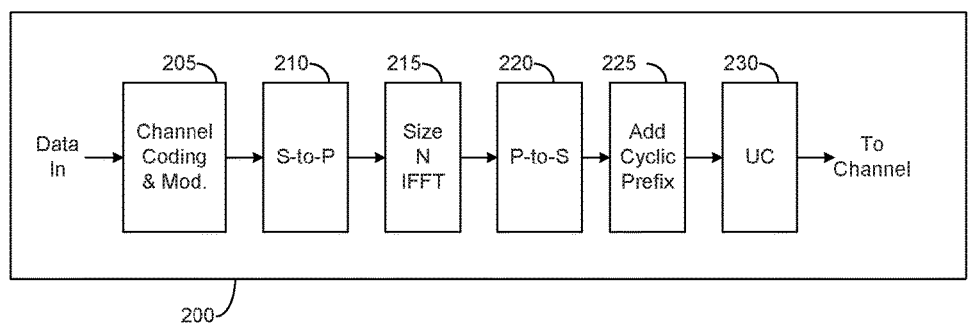
FIGS. 2A and 2B illustrate example wireless transmit and receive paths according to this disclosure.
Figure 2B:
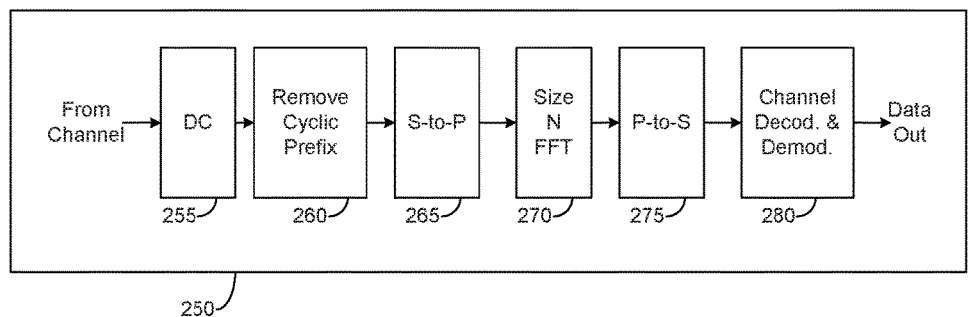

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
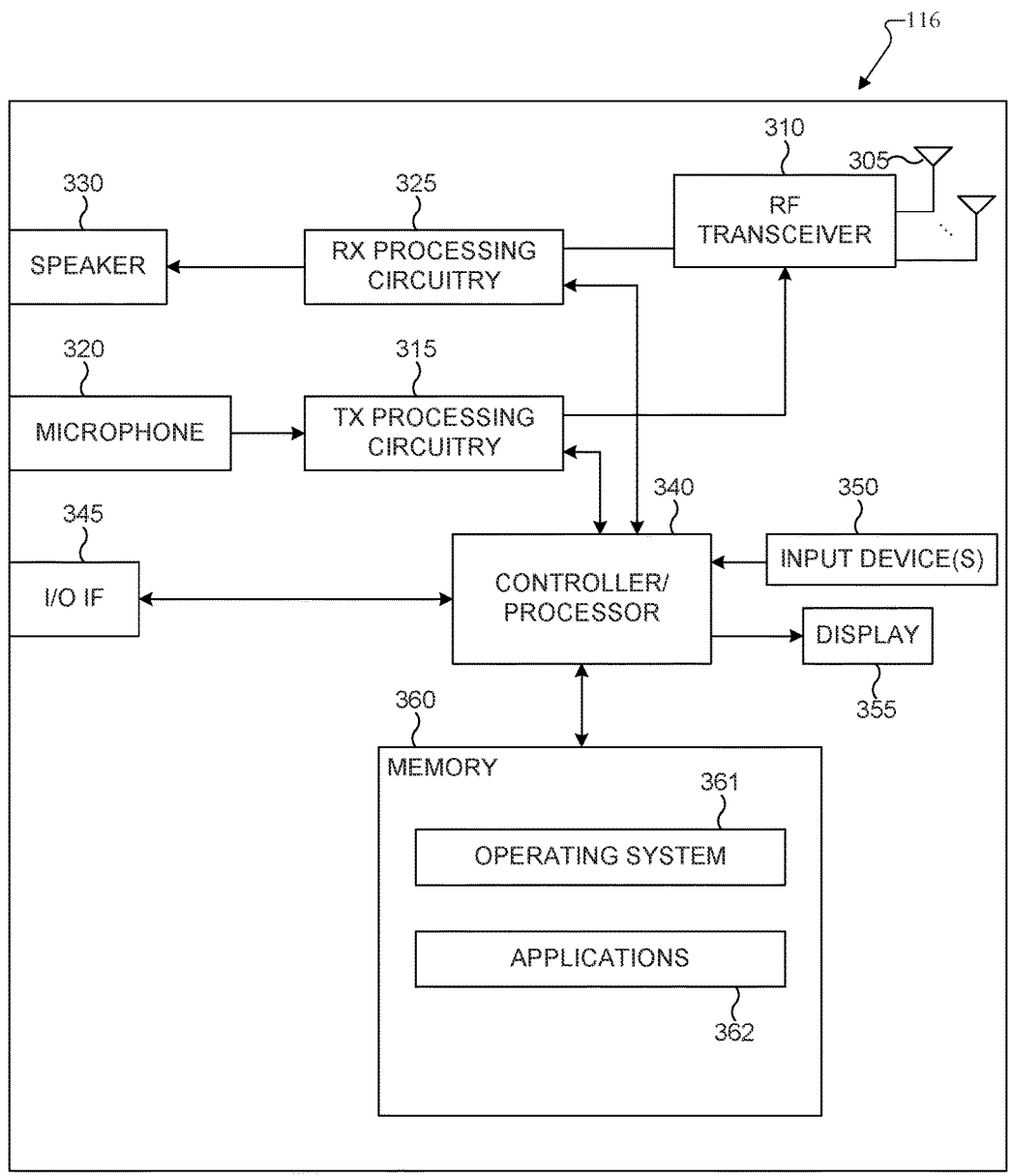
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes set of antennas 305, a radio frequency (RF) transceiver 310, transmit (TX) processing circuitry 315, a microphone 320, and receive (RX) processing circuitry 325. The UE 116 also includes a speaker 330, a processor or controller 340, an input/output (I/O) interface (IF) 345, input device(s) 350, a display 355, and a memory 360. The memory 360 includes an operating system (OS) program 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor or controller 340 can include one or more processors or other processing devices and execute the basic OS program 361 stored in the memory 360 in order to control the overall operation of the UE 116. For example, the processor or controller 340 could control the reception of forward channel signals and the transmission of reverse channel signals by the RF transceiver 310, the RX processing circuitry 325, and the TX processing circuitry 315 in accordance with well-known principles. In some embodiments, the processor or controller 340 includes at least one microprocessor or microcontroller.

The processor or controller 340 is also capable of executing other processes and programs resident in the memory 360, such as operations for channel quality measurement and reporting for systems having 2D antenna arrays as described in embodiments of the present disclosure as described in embodiments of the present disclosure. The processor or controller 340 can move data into or out of the memory 360 as required by an executing process. In some embodiments, the processor or controller 340 is configured to execute the applications 362 based on the OS program 361 or in response to signals received from eNBs or an operator. The processor/controller 340 is also coupled to the I/O interface 345, which provides the UE 116 with the ability to connect to other devices such as laptop computers and handheld computers. The I/O interface 345 is the communication path between these accessories and the main controller 340.

The processor or controller 340 is also coupled to the input device(s) 350 and display 355. The operator of the UE 116 can use the device(s) 350 to enter data into the UE 116. The display 355 may be a liquid crystal display or other display capable of rendering text and/or at least limited graphics, such as from web sites. The input device(s) 350 may be a touchscreen and or buttons for receiving user input.

The memory 360 is coupled to the processor or controller 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the processor/controller 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
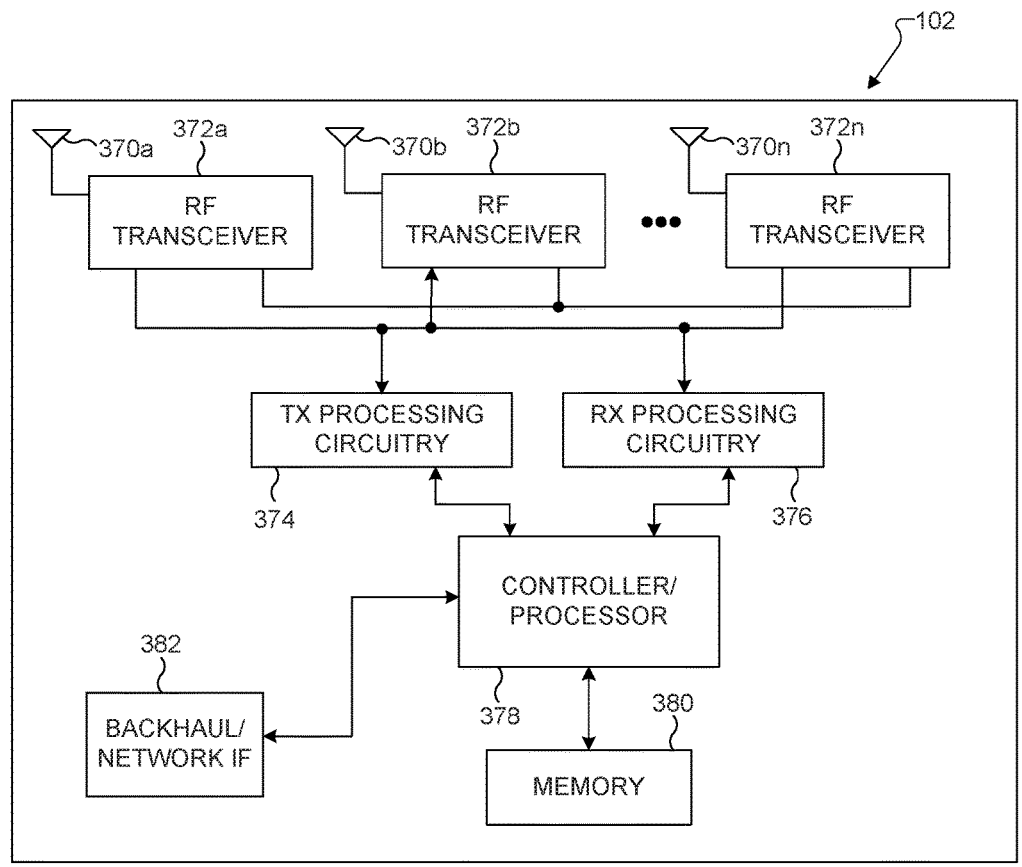
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can derive a CSI-RS resource indicator (CRI) by utilizing the CSI-RS. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports advanced feedback and reference signal transmissions for MIMO wireless communication systems. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 360 is coupled to the controller/processor 340. Part of the memory 360 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

FIGS. 4A to 4D illustrate antenna configurations and antenna numbering considered in some embodiments of the current invention.

In all the four antenna configurations of FIGS. 4A to 4D, cross pol (or X-pol) antenna array is considered, in which a pair of antenna elements in a same physical location are polarized in two distinct angles, e.g., +45 degrees and −45 degrees.

FIGS. 4A and 4B are antenna configurations with 16 CSI-RS ports, comprising 8 pairs of x-pol antenna elements placed in a 2D antenna panel. The 6 or 8 pairs can be placed in 2×4 (FIG. 4A) or 4×2 manner (FIG. 4B) on horizontal and vertical dimensions.

FIGS. 4C and 4D are antenna configurations with 12 CSI-RS ports, comprising 6 pairs of x-pol antenna elements placed in a 2D antenna panel. The 8 pairs can be placed in 2×3 (FIG. 4C) or 3×2 manner (FIG. 4D) on horizontal and vertical dimensions.

Antenna Number Assignment

In FIGS. 4A to 4D, antennas are indexed with integer numbers, 0, 1, ..., 15 for 16-port configurations (FIGS. 4A and 4B), and 0, ..., 11 for 12-port configurations (FIGS. 4C and 4D).

In fat arrays (such as 12-port config A and 16-port config A), antenna numbers are assigned such that consecutive numbers are assigned for all the antenna elements for a first polarization, and proceed to a second polarization.

For a given polarization, Numbering scheme 1: consecutive numbers are assigned for a first row with progressing one edge to another edge, and proceed to a second row. Numbering scheme 2: consecutive numbers are assigned for a first column with progressing one edge to another edge, and proceed to a second column.

For example, in FIG. 4A, antenna numbers 0-7 are assigned for a first polarization, and 8-15 are assigned for a second polarization; and antenna numbers 0-3 are assigned for a first row and 4-7 are assigned for a second row.

Antenna numbers in tall arrays (such as 12-port config B and 16-port config B) are obtained by simply rotating the fat antenna arrays (such as 12-port config A and 16-port config A) by 90 degrees.

PMI Feedback Precoder Generation

In some embodiments, when a UE is configured with 12 or 16 port CSI-RS for a CSI-RS resource, the UE is configured to report a PMI feedback precoder according to the antenna numbers in FIGS. 4A to 4D. A rank-1 precoder, $W_{m,n,p}$, which is an $N_{CSIRS} \times 1$ vector, to be reported by the UE has the following form:

$$W_{m,n,p} = [w_0 \; w_1 \; \cdots \; w_{N_{CSIRS}-1}]^T = \frac{1}{\sqrt{N_{CSIRS}}} \begin{bmatrix} v_m \otimes u_n \\ \varphi_p(v_{m'} \otimes u_{n'}) \end{bmatrix},$$

wherein:
- $N_{CSIRS}$=number of configured CSI-RS ports in the CSI-RS resource, e.g., 12, 16, the like;
- $u_n$ is a N×1 oversampled DFT vector for a first dimension, whose oversampling factor is $S_N$;
- $v_m$ is a M×1 oversampled DFT vector for a second dimension, whose oversampling factor is $S_M$;
- N≥M, in one alternative, (N,M)∈ {(4,2), (4,3)}; in another alternative, (N,M)∈ {(4,2), (4,3), (2,2)}; and
- $\varphi_p$ is a co-phase, e.g., in a form of $$e^{j\frac{2\pi p}{4}},$$

p=0, 1, 2, 3.

Here, example set of oversampling factors that can be configured for $S_N$ and $S_M$ are 4 and 8; and m, m'∈{0, 1, ..., $S_M M$}, and n, n'∈{0, 1, ..., $S_N N$}. In a special case, m=m' and n=n'.

Figure 5:
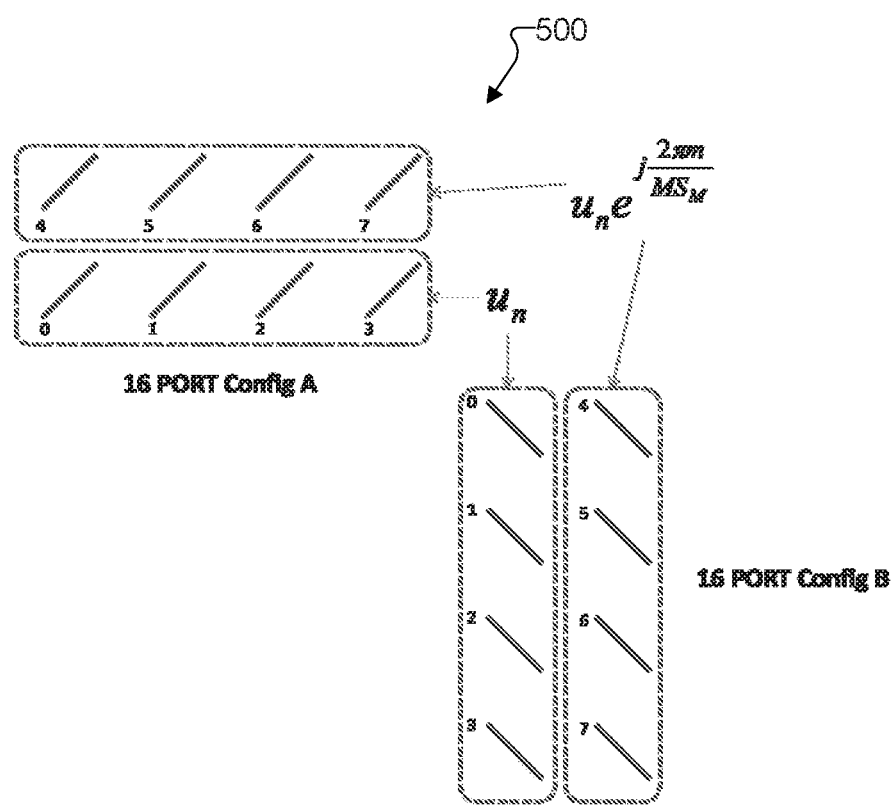
FIG. 5 illustrates a precoding weight application to antenna configurations of FIG. 6 according to embodiments of the present disclosure.

FIG. 5 illustrates a precoding weight application 500 to antenna configurations of FIGS. 4A to 4D according to embodiments of the present disclosure. The embodiment shown in FIG. 5 is for illustration only. Other embodiments could be used without departing from the scope of the present disclosure.

When any of 16-port config A and B is used at the eNB with configuring $N_{CSIRS}$=16 to the UE, a submatrix $v_m \otimes u_n$ of $W_{m,n,p}$ corresponds to a precoder applied on 8 co-pol elements, whose antenna numbers are 0 through 7. Given the antenna configuration, M=2 and N=4 should be configured for $v_m$ and $u_n$.

If 16-port config A is used, $u_n$ is a 4×1 vector representing a horizontal DFT beam and $v_m$ is a 2×1 vector representing a vertical DFT beam. If 16-port config B is used, $u_n$ is a 4×1 vector representing a vertical DFT beam and $v_m$ is a 2×1 vector representing a horizontal DFT beam.

With 12 or 16-port configurations, $v_m$ can be written as $$v_m = \begin{bmatrix} 1 & e^{j\frac{2\pi m}{M^?}} \end{bmatrix}^t = \begin{bmatrix} 1 & e^{j\frac{2\pi m}{MS_M}} \end{bmatrix}^t.$$

With 16-port configurations, $u_n$ can be written as:

$$u_n = \begin{bmatrix} 1 & e^{j\frac{2\pi n}{N'}} & e^{j\frac{4\pi n}{N'}} & e^{j\frac{6\pi n}{N'}} \end{bmatrix}^t = \begin{bmatrix} 1 & e^{j\frac{2\pi n}{NS_N}} & e^{j\frac{4\pi n}{NS_N}} & e^{j\frac{6\pi n}{NS_N}} \end{bmatrix}^t.$$

With 12-port configurations, $u_n$ can be written as:

$$u_n = \begin{bmatrix} 1 & e^{j\frac{2\pi n}{N'}} & e^{j\frac{4\pi n}{N'}} \end{bmatrix}^t = \begin{bmatrix} 1 & e^{j\frac{2\pi n}{NS_N}} & e^{j\frac{4\pi n}{NS_N}} \end{bmatrix}^t.$$

Precoding weights to be applied to antenna port numbers 0 through 3 are $u_n$, and the precoding weights to be applied to antenna ports 4 through 7 are $$u_n e^{j\frac{2\pi m}{MS_M}}$$

with an appropriate power normalization factor. Similarly, precoding weights to be applied to antenna port numbers 8 through 11 are $u_{n'}$, and the precoding weights to be applied to antenna ports 12 through 15 are $$u_{n'} e^{j\frac{2\pi m'}{MS_M}}$$

with an appropriate power normalization factor. This method of precoding weight application is illustrated in FIG. 5.

Figure 6:
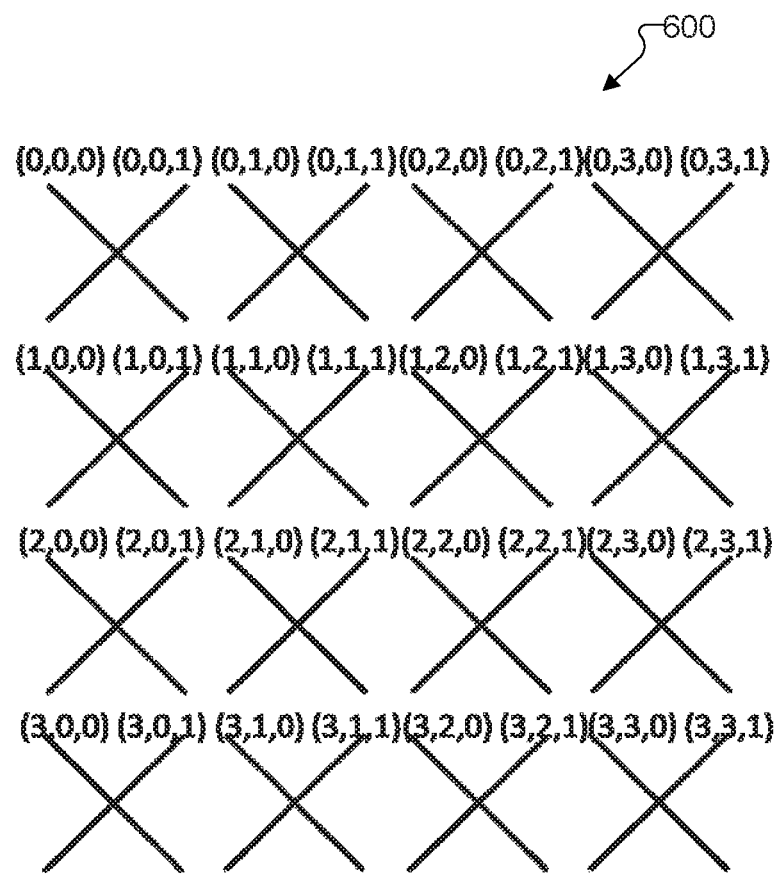
FIG. 6 illustrates another numbering of TX antenna elements according to this disclosure.

FIG. 6 illustrates another numbering of TX antenna elements 600 (or TXRU) according to embodiments of the present disclosure. The embodiment shown in FIG. 6 is for illustration only. Other embodiments could be used without departing from the scope of the present disclosure.

U.S. patent application Ser. No. 15/214,287 with the title of HIGHER RANK CODEBOOK FOR ADVANCED WIRELESS COMMUNICATION SYSTEMS discloses a parametrized KP double codebook, the disclosure of which is hereby incorporated by reference in its entirety. The summary of the disclosure is as follows. In some embodiments, eNB is equipped with 2D rectangular antenna array (or TXRUs), comprising M rows and N columns with P=2 polarized, wherein each element (or TXRU) is indexed with (m, n, p), and m=0, . . . , M−1, n=0, . . . , N−1, p=0, . . . , P−1, as illustrated in FIG. 6 with M=N=4. When FIG. 6 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 6.

In some embodiments, a UE is configured with a CSI-RS resource comprising Q=MNP number of CSI-RS ports, wherein the CSI-RS resource is associated with MNP number of resource elements (REs) in a pair of PRBs in a subframe.

A UE is configured with a CSI-RS configuration via higher layer, configuring Q antenna ports—antenna ports A(1) through A(Q). The UE is further configured with CSI reporting configuration via higher layer in association with the CSI-RS configuration. The CSI reporting configuration includes information element (IE) indicating the CSI-RS decomposition information (or component PMI port configuration). The information element may comprise at least two integers, say $N_1$ and $N_2$, which respectively indicates a first number of antenna ports for a first dimension, and a second number of antenna ports for a second dimension, wherein $Q=N_1 \cdot N_2$.

According to R1-154861, the following codebook construction is agreed. For each of 8, 12 and 16 Tx ports, a precoding matrix W in the codebook is represented as:

$$W = W_1 W_2$$

where:

$$W_1 = \begin{pmatrix} X_1 \otimes X_2 & 0 \\ 0 & X_1 \otimes X_2 \end{pmatrix}, W_2 \, FFS$$

$X_1$ is a $N_1 \times L_1$ matrix with $L_1$ column vectors being an $O_1 \times$ oversampled DFT vector of length $N_1$:

$$v_l = \begin{bmatrix} 1 & e^{\frac{j2\pi l}{N_1 O_1}} & \ldots & e^{\frac{j2\pi(N_1-1)l}{N_1 O_1}} \end{bmatrix}^t$$

$X_2$ is a $N_2 \times L_2$ matrix with $L_2$ column vectors being an $O_2 \times$ oversampled DFT vector of length $N_2$:

$$v_l = \begin{bmatrix} 1 & e^{\frac{j2\pi l}{N_2 O_2}} & \ldots & e^{\frac{j2\pi(N_2-1)l}{N_2 O_2}} \end{bmatrix}^t$$

$N_1$ and $N_2$ are the numbers of antenna ports per pol in $1^{st}$ and $2^{nd}$ dim.

FFS whether to select different beams (e.g. different X1 or X2) for the two pols FFS column selection from KP applied to $W_1$ A first alternative to construct such a codebook is: Tall, [square] and wide arrays are supported with a single codebook for each of [8], 12 and 16 CSI-RS ports. For PUSCH and PUCCH reporting, a codebook subset can be separately selected via RRC signaling of codebook subset selection parameters or a bitmap. FFS beam subset selection/restriction and related mechanism. FFS which and how the parameters (in Table 1) are related/configured A second alternative to construct such a codebook is:
Tall, [square] and wide port layouts are supported with parameters $N_1$, $N_2$
Values of $N_1$ and $N_2$ are RRC signaled
The parameters (in TABLE 1) define the codebook
Configurable oversampling factors, RRC signaled, values FFS
Other parameters are to be determined
FFS beam subset selection/restriction and related mechanism

TABLE 1

| Codebook parameters | |
|---|---|
| Parameter per dimension | Remark |
| Oversampling factors $O_d$ | Determines total number of beams $Q_d = O_d \cdot N_d$, d = 1, 2 in the codebook. |
| Beam group spacing | Difference of the leading beam indices of two adjacent beam groups |
| Number of beams in each beam group | May depend on rank and/or W1 |

TABLE 1-continued

Codebook parameters

| Parameter per dimension | Remark |
|---|---|
| Beam spacing | Difference of two adjacent beam indices in each beam group |

In some embodiments, a group of parameters for dimension d comprises at least one of the following parameters: a number of antenna ports $N_d$; an oversampling factor $o_d$; a skip number $s_d$; (for W1) a beam offset number $f_d$; a beam spacing number $p_d$; (for W2) and a number of beams $L_d$.

A beam group indicated by a first PMI $i_{1,d}$ of dimension d (corresponding to $W_d^{(1)}$), is determined based upon these six parameters.

The total number of beams is $N_d \cdot o_d$; and the beams are indexed by an integer $m_d$, wherein beam $m_d$, $v_{m_d}$, corresponds to a precoding vector $$v_{m_d} = \begin{bmatrix} 1 & e^{j\frac{2\pi m_d}{o_d N_d}} & \cdots & e^{j\frac{2\pi m_d (N_d-1)}{o_d N_d}} \end{bmatrix}^t,$$

$m_d = 0, \ldots, N_d \cdot o_d - 1$.

The first PMI of the first dimension $i_{1,d}$, $i_{1,d} = 0, \ldots, N_d \cdot o_d / s_d - 1$, can indicate any of $L_d$ beams indexed by:

$$m_d = f_d + s_d \cdot i_{1,d}, f_d + s_d \cdot i_{1,d} + p_d, \ldots, f_d + s_d \cdot i_{1,d} + (L_d - 1) p_d.$$

These $L_d$ beams are referred to as a beam group.

In some embodiments, the UE is configured with a parameterized KP codebook corresponding to the codebook parameters $(N_d, o_d, s_d, f_d, p_d, L_d)$ where d=1,2 from a master codebook by applying codebook subset selection (CSS). The master codebook is a large codebook with default codebook parameters.

Bounding the UE Complexity to Derive CSI
For the CSI process configurations:
CSI reporting with PMI
    A CSI process can be configured with either of two CSI reporting classes, A or B (FFS: both A and B):
        Class A, UE reports CSI according to W=W1W2 codebook based on {[8],12,16} CSI-RS ports
        Class B: UE reports L port CSI assuming one of the four alternatives below
            Alt.1: Indicator for beam selection and L-port CQI/PMI/RI for the selected beam. Total configured number of ports across all CSI-RS resources in the CSI process is larger than L.
            Alt.2: L-port precoder from a codebook reflecting both beam selection(s) and co-phasing across two polarizations jointly. Total configured number of ports in the CSI process is L.
            Alt.3: Codebook reflecting beam selection and L-port CSI for the selected beam. Total configured number of ports across all CSI-RS resources in the CSI process is larger than L.
            Alt.4: L-port CQI/PMFRI. Total configured number of ports in the CSI process is L. (if CSI measurement restriction is supported, it is always configured)
        Note: A "beam selection" (whenever applicable) constitutes either a selection of a subset of antenna ports within a single CSI-RS resource or a selection of a CSI-RS resource from a set of resources
        Note: The reported CSI may be an extension of Rel.12 L-port CSI
        Details such as possible values of L are FFS
        Further down-selection/merging of the four alternatives is FFS
    Study further for CSI measurement restriction
    A CSI process is associated with K CSI-RS resources/configurations (per definition in 36.211), with $N_k$ ports for the $k_{th}$ CSI-RS resource (K could be >=1)
        Note: it is up to RAN2 to design the signaling configuration structure to support the above association
        Maximum value of K is FFS
        Maximum total number of CSI-RS ports in one CSI process
            For CSI reporting class A, the Maximum total number of CSI-RS ports is 16
            FFS the maximum total number of CSI-RS ports in one CSI process is for CSI reporting class B
        For the purpose of RRC configuration of CSI-RS resource/configuration
            For CSI reporting Class A, RAN1 will choose one of the alternatives
                Alt.1: CSI-RS resource/configuration with $N_k$: =12/16 to be defined in the spec (The index of CSI-RS configuration can be configured for CSI process with K=1).
                Alt.2: 12/16 ports CSI-RS is an aggregation of K configured CSI-RS resources/configurations with 2/4/8 ports. (K>1)
                    FFS on the schemes for aggregation and port indexing
                    FFS between fixed or configurable value(s) for Nk
            For CSI reporting class B, FFS for details
        Note: It is possible to extend the value of $N_k$: in future releases
        FFS by RAN1 on the configuration restriction of using same CSI-RS resource/configuration parameters within one CSI process (e.g. $N_k$, Pc, CSR, scrambling ID, subframe config., etc.)
        FFS on the QCL on CSI-RS ports
        Inform RAN2 about the above decision to start RRC signaling structure discussion In the legacy specification of 3GPPTS36.213, the following is captured to bound the UE complexity to derive CSI when the UE is configured with multiple CSI processes.

If a UE is configured with more than one CSI process for a serving cell, the UE on reception of an aperiodic CSI report request triggering a CSI report according to Table 7.2.1-1B of 3GPPTS36.213 is not expected to update CSI corresponding to the CSI reference resource (defined in subclause 7.2.3 of 3GPPTS36.213) for all CSI processes except the max $(N_x - N_u, 0)$ lowest-indexed CSI processes for the serving cell associated with the request when the UE has $N_u$ unreported CSI processes associated with other aperiodic CSI requests for the serving cell, where a CSI process associated with a CSI request are counted as unreported in a subframe before the subframe where the PUSCH carrying the corresponding CSI is transmitted, and $N_{CSI-P}$ is the maximum number of CSI processes supported by the UE for the serving cell and:
    for FDD serving cell $N_x = N_{CSI-P}$;
    for TDD serving cell
        if the UE is configured with four CSI processes for the serving cell, $N_x = N_{CSI-P}$
        if the UE is configured with two or three CSI processes for the serving cell, $N_x = 3$.

If more than one value of $N_{CSI-P}$ is included in the UE-EUTRA-Capability, the UE assumes a value of $N_{CSI-P}$ that is consistent with its CSI process configuration. If more than one consistent value of $N_{CSI-P}$ exists, the UE may assume any one of the consistent values.

If a UE is configured with multiple cell groups, and if the UE receives multiple aperiodic CSI report requests in a subframe for different cell groups triggering more than one CSI report, the UE is not required to update CSI for more than 5 CSI processes from the CSI processes corresponding to all the triggered CSI reports.

Figure 7:
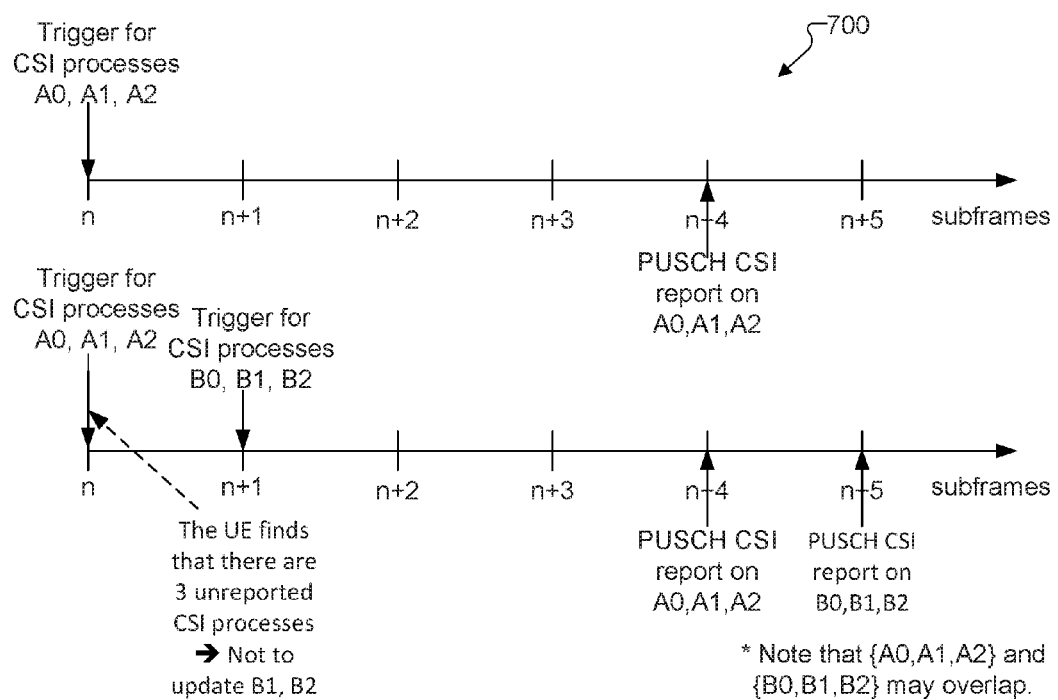
FIG. 7 illustrates example CSI reporting UE behavior to ensure the UE complexity is bounded below the UE capability.

FIG. 7 illustrates example CSI reporting UE behavior 700 to ensure the UE complexity is bounded below the UE capability. (UE complexity≤UE capability for TM10) The embodiment shown in FIG. 7 is for illustration only. Other embodiments could be used without departing from the scope of the present disclosure.

When a UE is triggered to report CSI on three CSI processes A0, A1 and A2 in subframe n, the UE can update all the CSI and report it in subframe n+4 (top figure). On the other hand, when the UE is also triggered to report CSI on three (potentially) other CSI processes B0, B1 and B2, the UE is allowed not to update CSI of CSI process of B1 and B2.

UE Capability for Class a Reporting

For FD-MIMO operation, a UE can be configured to report 12- or 16-port CSI (class A CSI reporting) and a corresponding NZP CSI-RS resource. The UE complexity to compute 12- or 16-port CSI depends upon the codebook size after CSS. Hence, a new UE capability can be defined at least in terms of the maximum codebook size the UE supports for 12- or 16-port CSI reporting operation.

In some embodiments, a UE can signal or provide a new UE capability IE to serving eNB or the network, say, maxSupportedOversamplingFactors. Depending on the configured value of maxSupportedOversamplingFactors, some of those codebook parameters for class A reporting (in each configured CSI process) are correspondingly determined, in such a way that the oversampling factor (after the CSS) is at most the configured value of maxSupportedOversamplingFactors.

In one method, the UE provides maxSupportedOversamplingFactors per dimension.

In one method, UE is configured to derive the oversampling factor for the $1^{st}$ and $2^{nd}$ dimensions to be min($o_1$, $o_{max1}$) and min($o_2$, $o_{max2}$), where $o_1$ and $o_2$ are oversampling factor values for the first and second dimensions in the higher layer configured by DL control signaling by eNB, and it is assumed that ($o_{max1}$, $o_{max2}$) are the UE capability indicated in the higher layer, by the IE maxSupportedOversamplingFactors.

In this case, the UE is further configured to report the first PMI ($i_1$) according to the eNB configured oversampling factor values, i.e., $o_1$ and $o_2$, with subsampling the candidate first PMI values according to a subsampling factor, $o_{max,d}/o_d$. In one example, the UE is configured with $o_1=o_2=8$, but UE capability is such that $o_{max1}=o_{max2}=4$. Suppose further that $s_1=s_2=2$. Then according to the eNB configuration ($o_1$ and $o_2$), the total number of bit for the first PMI is 8 (=4+4) bits, and the corresponding DFT vectors in the first and the second dimensions are indexed as $i_{1,1}$, $i_{1,2} \in \{0, 1, 2, \ldots, 15\}$. However, according to the UE capability, UE is further configured to select a subsampled values by a subsampling factor of 2 ($=o_1/o_{max1}=o_2/o_{max2}$) in both cases. Table 1 illustrates such a method, to subsample PMI index for the UE to comply with the UE capability and eNB signaling.

TABLE 1

PMI index subsampling for the UE to comply with the UE capability and eNB signaling

| Configured UE capability for maximum oversampling factor for dimension d | Candidate first PMI indices ($i_{l,d}$) for the UE PMI search when configured with $o_d = 8$ | Sub-sampling factor ($=o_{max,d}/o_d$) |
|---|---|---|
| $o_{max,d} = 8$ | $0, s_d, 2s_d, 3s_d, 4s_d, 5s_d, \ldots, o_d N_d - s_d$ | 1 |
| $o_{max,d} = 4$ | $0, 2s_d, 4s_d, 6s_d, \ldots, o_d N_d - 2s_d$ | 2 |
| $o_{max,d} = 2$ | $0, 4s_d, 8s_d, 12s_d, \ldots, o_d N_d - 4s_d$ | 4 |

In another method, UE is not expected to be configured with oversampling factors for the $1^{st}$ and $2^{nd}$ dimensions, greater than $o_{max1}$ and $o_{max2}$, wherein ($o_{max1}$, $o_{max2}$) are indicated in the higher layer, by the IE maxSupportedOversamplingFactors.

In some embodiments, a UE can signal or provide a new UE capability IE to serving eNB or the network, say, maxSupportedMimoCodebookSize. Depending on the UE capability value of maxSupportedMimoCodebookSize, some of those codebook parameters for class A reporting (in each configured CSI process) are correspondingly determined, in such a way that the rank-1 and rank-2 codebook size after the CSS is at most the UE capability value of maxSupportedMimoCodebookSize.

In one method, maxSupportedMimoCodebookSize is indicated in terms of sum number of bits for the first and the second PMI's corresponding to RI=1: $i_1$ and $i_2$. In one example, candidate values for maxSupportedMimoCodebookSize includes 8, 10 and 12 bits.

When a UE is configured with maxSupportedMimoCodebookSize=8, total number of bits for $i_1$ and $i_2$ are restricted to 8, e.g., 4 bits for $i_1$ and 4 bits for $i_2$. This goal may be achieved with configuring small oversampling factors for the $1^{st}$ and the $2^{nd}$ dimensions.

Some examples to achieve this, for the 16 port case, are:
$o_1=2$, $o_2=4$, $s_1=s_2=2$; or
$o_1=1$, $o_2=2$, $s_1=s_2=1$.

When a UE is configured with maxSupportedMimoCodebookSize=12, total number of bits for $i_1$ and $i_2$ are restricted to 12, e.g., 8 bits for $i_1$ and 4 bits for $i_2$. In this case, large oversampling factors can be allocated to for the $1^{st}$ and the $2^{nd}$ dimensions.

Some examples to achieve this, for the 16 port case, are:
$o_1=8$, $o_2=16$, $s_1=s_2=2$; or
$o_1=4$, $o_2=8$, $s_1=s_2=1$.

In some embodiments, the oversampling factor(s) is(are) implicitly configured by the UE capability parameter maxSupportedMimoCodebookSize, as illustrated in the above example.

In some embodiments, a UE can be further explicitly configured with the oversampling factors for the two dimensions, as well as the maxSupportedMimoCodebookSize=$B_{maxCWSize}$. The UE is further configured to use 4 bits for the second PMI feedback ($i_2$). In this case, maximum the oversampling factors that UE supports are constrained by maxSupportedMimoCodebookSize. The UE is not expected to be configured with oversampling factors that exceed the UE capability. In other words, the UE is not expected to be configured with $N_1$, $N_2$, $o_1$ and $o_2$ that will incur the following condition: ceil $(\log(N_1 \cdot o_1 \cdot N_2 \cdot o_2)) > B_{maxCWSize} - 4$.

In some embodiments, a UE can be further explicitly configured with the oversampling factors for the two dimensions and number of beams ($L_1$, $L_2$) for the two dimensions, as well as the maxSupportedMimoCodebookSize=$B_{maxCWSize}$. In this case, maximum the oversampling factors that UE supports are constrained by maxSupportedMimoCodebookSize. The UE is not expected to be configured with oversampling factors and ($L_1$, $L_2$) that exceed the UE capability. In other words, the UE is not expected to be configured with $L_1$, $L_2$, $N_1$, $N_2$, $o_1$ and $o_2$ that will incur the following condition: ceil(log($N_1 \cdot o_1 \cdot N_2 \cdot o_2$))>$B_{maxCWSize}$−$\log_2$ ($L_1 \cdot L_2$); and the number of bits for the second PMI ($i_2$) is determined by $\log_2$ ($L_1 \cdot L_2$).

In some embodiments, a UE can be further explicitly configured with the oversampling factors for a codebook subset selection bitmap for beam grouping, as well as the maxSupportedMimoCodebookSize=$B_{maxCWSize}$. The codebook subset selection bitmap indicates which of those beams in the W2 codebook can be selected by W2 (or $i_2$) codepoint: if a bit in position a is set, a-th beam is included in a subset which $i_2$ can select a beam from; otherwise a-th beam is excluded from the subset. In this case, maximum the oversampling factors that UE supports are constrained by maxSupportedMimoCodebookSize. The UE is not expected to be configured with oversampling factors and codebook subset selection bitmap that exceed the UE capability. In other words, the UE is not expected to be configured with $N_1$, $N_2$, $o_1$ and $o_2$ that will incur the following condition: ceil(log($N_1 \cdot o_1 \cdot N_2 \cdot o_2$))>$B_{maxCWSize}$−$\log_2$ (A); and the number of bits for the second PMI ($i_2$) is determined by $\log_2$ (A), wherein A is the number of beams in the sub set.

According to the agreement the total number of CSI-RS ports and maximum K number of CSI-RS resources per CSI process is FFS. The choice of these numbers should be carefully selected to comply with the UE complexity budget (or UE capability).

In some embodiments, the maximum oversampling factor(s), ($o_{max1}$, $o_{max2}$), is (are) implicitly configured by the UE capability parameter maxSupportedMimoCodebookSize. Suppose that maxSupportedMimoCodebookSize=$B_{maxCWSize}$. In one method, $o_{max1}$=$o_{max2}$=($B_{maxCWSize}$−4)/2. In another method, $o_{max1}$=$o_{max2}$=($B_{maxCWSize}$−$\log_2$ ($L_1 \cdot L_2$))/2. In another method, $o_{max1}$=$o_{max2}$=($B_{maxCWSize}$−$\log_2$(A))/2.

UE Capability for Class B Reporting

To see the UE complexity situation for class-B reporting, consider an example scenario, in which a UE is configured with class-B CSI reporting for a CSI process, wherein K=4 number of 8-port CSI-RS resources are configured. In this case the UE needs to calculate CSI for all these K=4 CSI-RS resources. Since the codebook size for the 8-port codebook is 8 bits and the total number of CSI-RS resources K=4, the PMI search complexity is similar to the case where 10 bit codebook is configured for the class A reporting.

Assuming that minimum UE capability for R13 is to be able to support a 10 bit codebook, maximum K value can be 4.

Thinking along this line, in one method, embodiments of the present disclosure provide that maximum total number of antenna ports in a CSI process for class-B reporting is implicitly configured according to the value of maxSupportedMimoCodebookSize.

If maxSupportedMimoCodebookSize indicates that 8 bit codebook is supported for class A, maximum total number of antenna ports for a class-B CSI process is 8.

If maxSupportedMimoCodebookSize indicates that 10 bit codebook is supported for class A, maximum total number of antenna ports for a class-B CSI process is 32.

If maxSupportedMimoCodebookSize indicates that 12 bit codebook is supported for class A, maximum total number of antenna ports for a class-B CSI process is 128.

In general, if maxSupportedMimoCodebookSize indicates that (8+n) bit codebook is supported for class A, maximum total number of antenna ports for a class-B CSI process is $8*2^n$.

In another method, the UE can signal or provide maxSupportedMimoCodebookSize as a UE capability for class-B reporting to its serving eNB or the network, the values of which include 8, 16, 32, 64, 128, . . . .

In one method, the UE is not expected to be configured with a CSI process whose total number of CSI-RS exceeds the maximum total number of antenna ports.

In some embodiments, the UE capability signaling of maxSupportedMimoCodebookSize is used to restrict the rank-1 codebook size for class A reporting, and to restrict the total number of antenna ports for class B reporting.

Embodiments on UE Capability for Rank>=1

In some embodiments, a UE can be configured with a new UE capability IE, say, (r, maxSupportedMimoCodebookSize) for a given rank r. Depending on the configured value of (r, maxSupportedMimoCodebookSize), some of those rank-r codebook parameters for class A reporting are correspondingly determined, in such a way that the rank-r codebook size after the CSS is according to the configured value of (r, maxSupportedMimoCodebookSize).

In one method, (r, maxSupportedMimoCodebookSize) is indicated in terms of total number of bits for the first and the second PMI's: $i_1$ and $i_2$ for the rank-r codebook. In one example, candidate values for r includes 1 and 2, and that for maxSupportedMimoCodebookSize includes 8, 10 and 12 bits.

In one method, a UE is configured with (r, maxSupportedMimoCodebookSize) for either rank-1 (r=1) or rank-2 (r=2) codebooks.

When a UE is configured with (r, maxSupportedMimoCodebookSize)=(r,8), where r=1 or 2, total number of bits for rank-r $i_1$ and $i_2$ are restricted to 8, e.g., 4 bits for $i_1$ and 4 bits for $i_2$. This goal may be achieved with configuring small oversampling factors for the $1^{st}$ (long) and the $2^{nd}$ (short) dimensions of the rank-r codebook: such as $o_1$=2, $o_2$=4, $s_1$=$s_2$=2 for the 16 port case.

When a UE is configured with (r, maxSupportedMimoCodebookSize)=(r,12), where r=1 or 2, total number of bits for rank-r $i_1$ and $i_2$ are restricted to 12, e.g., 8 bits for $i_1$ and 4 bits for $i_2$. In this case, large oversampling factors can be allocated to for the $1^{st}$ (long) and the $2^{nd}$ (short) dimensions of the rank-r codebook: such as $o_1$=8, $o_2$=16, $s_1$=$s_2$=2 for 16 port case.

In another method, a UE is configured with the pair (1, maxSupportedMimoCodebookSize) and (2, maxSupportedMimoCodebookSize) for rank-1 and rank-2 codebooks.

When a UE is configured with (1, maxSupportedMimoCodebookSize)=(1,8) and (2, maxSupportedMimoCodebookSize)=(2,8), total number of bits for rank-1 (and rank-2), $i_1$ and $i_2$ are restricted to 8, e.g., 4 bits for $i_1$ and 4 bits for $i_2$. This goal may be achieved with configuring small oversampling factors for the $1^{st}$ (long) and the $2^{nd}$ (short) dimensions of both rank-1 and rank-2 codebooks: such as $o_1$=2, $o_2$=4, $s_1$=$s_2$=2 for the 16 port case.

When a UE is configured with (1, maxSupportedMimoCodebookSize)=(1,12) and (2, maxSupportedMimoCodebookSize)=(2,12), total number of bits for rank-1 (and rank-2), $i_1$ and $i_2$ are restricted to 12, e.g., 8 bits for $i_1$ and 4 bits for $i_2$. In this case, large oversampling factors can be allocated to for the 1$^{st}$ (long) and the 2$^{nd}$ (short) dimensions of both rank-1 and rank-2 codebooks: such as $o_1=8$, $o_2=16$, $s_1=s_2=2$ for 16 port case.

In this example, embodiments of the present disclosure provide that the oversampling factor is implicitly configured by the UE capability signaling maxSupportedMimoCodebookSize.

Embodiments on UE Capability for Dimension D

In some embodiments, a UE can be configured with a new UE capability IE, which includes dimension d, where d=1 or 2, to configure the codebook size depending on the dimension. Depending on the configured value of d, some of those codebook parameters related to dimension d for class A reporting are correspondingly determined, in such a way that the codebook size after the CSS is according to the configured value of (r, maxSupportedMimoCodebookSize).

When a UE is configured with (d, r, maxSupportedMimoCodebookSize)=(2,r,12), where r=1 or 2, total number of bits for rank-r $i_1$ and $i_2$ are restricted to 12, e.g., 4 bits for $i_{1,1}$, 4 bits for $i_{1,2}$, and 4 bits for $i_2$. In this case, oversampling factors that can be allocated to for the 1$^{st}$ (long) and the 2$^{nd}$ (short) dimensions of the rank-r codebook are $o_1=8$, $o_2=16$, $s_1=s_2=2$ for 16 port case.

When a UE is configured with (d, r, maxSupportedMimoCodebookSize)=(2,r,10), where r=1 or 2, total number of bits for rank-r $i_1$ and $i_2$ are restricted to 10, e.g., 4 bits for $i_{1,1}$, 2 bits for $i_{1,2}$, and 4 bits for $i_2$. In this case, oversampling factors that can be allocated to for the 1$^{st}$ (long) and the 2$^{nd}$ (short) dimensions of the rank-r codebook are such as $o_1=8$, $o_2=4$, $s_1=s_2=2$ for 16 port case.

In Section 5.2.2.6 of 3GPP TS 36.212, the following text is captured for the maximum number of layers to be reported by the RI:

For rank indication (RI) (RI only, joint report of RI and i1, and joint report of RI and PTI)

The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:
    If the UE is configured with transmission mode 9, and the supportedMIMO-CapabdityDL-r10 field is included in the UE-EUTRA-Capability, the maximum number of layers is determined according to the minimum of the configured number of CSI-RS ports and the maximum of the reported UE downlink MIMO capabilities for the same band in the corresponding band combination.
    If the UE is configured with transmission mode 9, and the supportedMIMO-CapabdityDL-r10 field is not included in the UE-EUTRA-Capability, the maximum number of layers is determined according to the minimum of the configured number of CSI-RS ports and ue-Category (without suffix).
    If the UE is configured with transmission mode 10, and the supportedMIMO-CapabdityDL-r10 field is included in the UE-EUTRA-Capability, the maximum number of layers for each CSI process is determined according to the minimum of the configured number of CSI-RS ports for that CSI process and the maximum of the reported UE downlink MIMO capabilities for the same band in the corresponding band combination.
    If the UE is configured with transmission mode 10, and the supportedMIMO-CapabilityDL-r10 field is not included in the UE-EUTRA-Capability, the maximum number of layers for each CSI process is determined according to the minimum of the configured number of CSI-RS ports for that CSI process and ue-Category (without suffix).
    Otherwise the maximum number of layers is determined according to the minimum of the number of PBCH antenna ports and ue-Category (without suffix).

For CSI reporting with PMI, and two CSI reporting classes, i.e., class A and B, are introduced.

A CSI process can be configured with either of two CSI reporting classes, A or B (FFS: both A and B):
  Class A, UE reports CSI according to W=W1W2 codebook based on {[8],12,16} CSI-RS ports
  Class B: UE reports L port CSI assuming one of the four alternatives below
    Alt.1: Indicator for beam selection and L-port CQI/PMI/RI for the selected beam. Total configured number of ports across all CSI-RS resources in the CSI process is larger than L.
    Alt.2: L-port precoder from a codebook reflecting both beam selection(s) and co-phasing across two polarizations jointly. Total configured number of ports in the CSI process is L.
    Alt.3: Codebook reflecting beam selection and L-port CSI for the selected beam. Total configured number of ports across all CSI-RS resources in the CSI process is larger than L.
    Alt.4: L-port CQI/PMI/RI. Total configured number of ports in the CSI process is L. (if CSI measurement restriction is supported, it is always configured)
    Note: A "beam selection" (whenever applicable) constitutes either a selection of a subset of antenna ports within a single CSI-RS resource or a selection of a CSI-RS resource from a set of resources
    Note: The reported CSI may be an extension of Rel.12 L-port CSI
    Details such as possible values of L are FFS
    Further down-selection/merging of the four alternatives is FFS CSI processes can be configured with CSI reporting class B, according to the following details:
  A CSI process is associated with K CSI-RS resources/configurations (per definition in 36.211), with $N_k$ ports for the $k_{th}$ CSI-RS resource (K could be >=1)
  Maximum value of K is FFS
  Maximum total number of CSI-RS ports in one CSI process
    FFS the maximum total number of CSI-RS ports in one CSI process is for CSI reporting class B
  For the purpose of RRC configuration of CSI-RS resource/configuration
    For CSI reporting class B, FFS for details The following aspects are identified for CSI reporting class B.
  Number of antenna ports L for CSI (e.g., 2, 4, 8)
  Class B Alt-1:
    Beam selection indicator (BI) definition, e.g. RSRP or CSI based, wideband vs. subband, short-term vs. long-term
    BI bitwidth (related to K)
    Support for rank>2 UE specific beamforming
    UCI feedback mechanisms on PUCCH/PUSCH
  Class B Alt-2:
    Codebook for beam selection and co-phasing (either derived from legacy codebook(s) or codebook components, or newly designed)

Along with the associated PMI (e.g. assuming W=W2 in the newly designed or legacy codebook)
UCI feedback mechanisms on PUCCH/PUSCH
Class B Alt-3:
Codebook for beam selection and CSI
PMI contains the information of selected beam and the precoding matrix for the L-port within the selected beam
UCI feedback mechanisms on PUCCH/PUSCH
Class B Alt-4:
Measurement restriction mechanism; may be also applicable to Alt-1 to 3.

For Class B Alt B, a new indicator is introduced, which is called beam selection indicator (BI).

In some embodiments, BI is called CRI, or CSI-RS resource indicator.

For FD-MIMO operations, many companies have showed a view that multiple CSI-RS resources should be able to be configured for a CSI process. For 12- or 16-port CSI-RS resource configuration for class A CSI reporting, one promising option is to aggregate multiple legacy CSI-RS resources. The main motivation of this is to make the resource mapping flexible and future-proof. For class B reporting with cell-specific beamformed CSI-RS, majority view seems to be to configure multiple CSI-RS resources and a single periodic & aperiodic CSI reporting configuration. This seems to be a good way to simplify the RRC configuration for class B CSI reporting.

On the other hand, whether to allow FD-MIMO operation without CSI-IM or not is considered. It is noted that CSI process is defined only in TM10, and always in terms of a pair of CSI-RS resource and CSI-IM resource in the legacy specifications. Hence, to allow FD-MIMO operations without CSI-IM, embodiments of the present disclosure introduce a composite CSI-RS resource, which just refers to an aggregation of legacy CSI-RS resources. The composite CSI-RS resource can refer to CSI-RS resource for both class A and class B CSI reporting.

As in the agreement, BI bitwidth should be related to either K, or maximum possible configured value of K.

In one example, a UE can be configured with $K \in \{1, 2, \ldots, 8\}$ CSI-RS resources per CSI process (or per composite CSI-RS resource). Then, the BI bit width can be either determined as $ceil(\log_2(K))$, or 3 bits (=$\log_2$(max K)=$\log_2(8)$).

In some embodiments, a UE is configured with a CSI process comprising $K \in \{1, 2, \ldots, 8\}$ CSI-RS resources, and also configured to report CSI related to the CSI process periodically on PUCCH, wherein CSI includes BI, PMI, RI, CQI, and numbers of the configured CSI-RS ports for k-th CSI-RS resource is denoted as $N_k \in \{1, 2, 4, 8\}$.

The UE is further configured to jointly report BI and RI on a single PUCCH in those subframes configured for the RI reporting.

In case at least one of BI and RI reporting is configured, the reporting interval of the BI/RI reporting is an integer multiple $M_{RI}$ of period $N_{pd}$ (in subframes). The reporting instances for BI/RI are subframes satisfying:

$$(10 \times n_f + \lfloor n_s/2 \rfloor - N_{OFFSET,CQI} - N_{OFFSET,RI}) \mod (N_{pd} \cdot M_{RI}) = 0$$

where, $n_f$ is a radio frame number, $n_s$ is a slot number, $N_{OFFSET,CQI}$ is a positive integer, $N_{OFFSET,CRI}$ is a positive integer.

In some embodiments, the reporting instances for CRI/RI are determined differently depending on whether BI or RI or both are configured.

In one method, the reporting instances for CRI/RI are subframes satisfying $$(10 \times n_f + \lfloor n_s/2 \rfloor - N_{OFFSET,CQI} - N_{OFFSET,RI} - N_{OFFSET,CRI}) \mod (N_{pd} \cdot M_{RI} \cdot M_{CRI}) = 0, \text{ and};$$

If only CRI is configured, $N_{OFFSET,RI}$ is set to 0 and $M_{RI}$ is set to 1.

If only RI is configured, $N_{OFFSET,CRI}$ is set to 0 and $M_{CRI}$ is set to 1.

The RI bit width is 3 bits, if maximum supported rank in the standards specifications is 8. Then, if maximum configured value of K is 8, the maximum number of bits to be reported on the PUCCH is 6=(3 for RI+3 for BI) bits.

One application scenario of FD-MIMO related BI feedback is described in R1-154292. In one example, a 8 physical antennas are respectively installed on the 8 floors of a 8-floor building, and 8 CSI-RS ports are respectively allocated to the 8 physical antennas. When a UE is configuring with such a CSI process, the UE is configured to report 3-bit BI and corresponding CQI, to indicate from which of the 8 physical antennas the UE receives the strongest signal. Then, the eNB can use the BI and CQI to serve the UE with link adaptation. This way, operators can save CapEX, as only one eNB need to be purchased to serve the whole 8-floor building.

From this example it is evident that for some application scenarios in which $N_k=1$, only BI and CQI reporting is sufficient and RI and PMI reporting is not necessary, while for some other application scenarios in which $N_k>1$, additional CSI such as RI and PMI may be necessary.

In one method, a single $N_k$ value equal to N is commonly configured for all the K CSI-RS resources comprising the CSI process. Then, the total bit width and the contents to be reported in the RI reporting instance are determined according to the configured value of N.

If N=1, only BI is reported and hence the total bit width is the same as the BI bit width.

If N>1, both BI and RI are reported and hence the total bit width is determined as the sum of BI and RI bit width.

In another method, for the K CSI-RS resources comprising the CSI process, K number of $N_k$ are configured such that the CSI-RS resources comprise different number of antenna ports. This method allows flexible configuration of CSI-RS resources dependent upon some usage scenarios, but it poises challenge to define UE behaviour to determine the bit width, because there are multiple $N_k$ values. If at least one Nk is greater than 1, RI has to be reported. Hence, the following UE operation can be devised.

In this case, the total bit width and the contents to be reported in the RI reporting instances are determined according to the configured values of $\{N_k\}$.

In one example, If $\max\{N_k\}=1$, only BI is reported and hence the total bit width is the same as the BI bit width. If $\max\{N_k\}>1$, both BI and RI are reported and hence the total bit width is determined as the sum of BI and RI bit width.

In another example, If $\max\{N_k\}=1$, only BI is reported and hence the total bit width is the same as the BI bit width. If $\max\{N_k\}>1$, both BI and RI are reported and hence the total bit width is determined as the sum of BI and RI bit width.

On the other hand, maximum number of layers to be reported by the RI also needs to be specified differently, according to the FD-MIMO related configurations. The maximum number needs to be determined dependent upon which CSI reporting class is used, and whether supportedMIMO-CapabilityDL field is included in the UE-EUTRA-Capability or not. In particular, when class B reporting is configured, the maximum RI should be at least partly determined dependent upon max $\{N_k\}$, so that the maximum rank is properly reported. On the other hand, when class A reporting is configured, the maximum RI should be at least partly determined dependent upon (total) number of CSI-RS ports of the (composite) CSI-RS resource.

In some embodiment, UE-EUTRA-Capability represents a UE Capability Information message carrying EURTA capability, and is a positive integer.

In some embodiments, supportedMIMO-CapabilityDL represents a supported MIMO capability of the UE for a specific serving cell and is a positive integer.

In addition, the maximum number of layers to be reported by the RI is determined according to the following:
  If the UE is configured with class B reporting, and the supportedMIMO-CapabilityDL field is included in the UE-EUTRA-Capability, the maximum number of layers is determined according to the minimum of the two:
    max $\{N_k\}$ or N determined according to the composite CSI-RS resource configured for that CSI process and;
    the maximum of the reported UE downlink MIMO capabilities for the same band in the corresponding band combination.
  If the UE is configured with class A reporting, and the supportedMIMO-CapabilityDL field is included in the UE-EUTRA-Capability, the maximum number of layers is determined according to the minimum of the two:
    (Total) number of CSI-RS ports of the (composite) CSI-RS resource configured for that CSI process and;
    the maximum of the reported UE downlink MIMO capabilities for the same band in the corresponding band combination.
  If the UE is configured with class B reporting, and the supportedMIMO-CapabilityDL field is not included in the UE-EUTRA-Capability, the maximum number of layers is determined according to the minimum of the two:
    max $\{N_k\}$ or N determined according to the composite CSI-RS resource configured for that CSI process and;
    ue-Category (without suffix).
  If the UE is configured with class A reporting, and the supportedMIMO-CapabilityDL field is included in the UE-EUTRA-Capability, the maximum number of layers is determined according to the minimum of the two:
    (Total) number of CSI-RS ports of the (composite) CSI-RS resource configured for that CSI process and;
    ue-Category (without suffix).

In some embodiments, ue-Category represent a category of a UE, and each of the different UE categories is associated with a different downlink peak data rate.

Quasi co-location (QCL) type B has been specified mainly for CoMP operation scenarios, such as CoMP scenario 3 and CoMP scenario 4. To support CoMP scenario 4, the legacy specification allows that at least the delay parameters can be estimated with CSI-RS. It is not clear whether beamformed CSI-RS can be used for estimating the delay parameters, and this can be a point to be studied. According to the legacy specification, when a UE is configured with type B QCL, the UE can be configured with a list of NZP CSI-RS-Id's that can be used for estimating the delay parameters and the UE can be dynamically indicated by the PQI field which NZP CSI-RS to use. The NZP CSI-RS indicated by the NZP CSI-RS Id's configured for the PQI field do not need to be associated with any CSI feedback according to the legacy RRC specification. In this case no beamformed CSI-RS needs to be associated with the PQI; instead, non-precoded CSI-RS can be configured for delay estimation purpose per TP, and the identity of the non-precoded CSI-RS can be indicated by the PQI related signalling. It is noted that this may not involve additional CSI-RS overhead in the system, because the non-precoded CSI-RS is likely to be anyway necessary to be transmitted to support legacy UEs in the system.

Observation: The delay parameters estimated with beamformed CSI-RS may not be the same as those estimated with non-precoded CSI-RS.

Observation: For UE's delay parameter estimation for QCL type B for FD-MIMO CoMP operation, eNB may be able to separately configure non-precoded CSI-RS resources, as well as beamformed CSI-RS resources. The non-precoded CSI-RS resources can be configured per TP.

A UE can be configured with up to K=8 NZP CSI-RS resources for CSI reporting class B, and each of those 8 CSI-RS resources may contain qcl-CRS-info if QCL type B is also configured. Because up to three CSI processes can be configured in TM10, the total number of NZP CSI-RS resources is up to 24, and hence the maximum number of QCL assumptions will be also 24. Unless proper restrictions are placed, the UE complexity related to QCL for deriving channel parameters is significantly higher than Rel-12.

At least three alternatives are identified to limit the UE complexity related to QCL type B:
  Alt 1: Disable QCL type B configuration for Class B CSI reporting.
    This alternative can maintain the UE complexity related QCL as for R12, but it cripples simultaneous operation of FD-MIMO and CoMP, and it is not preferred.
    In other words, the UE is not expected to be configured with QCL type B if class B CSI reporting is configured.
  Alt 2: A single common qcl-CRS-info is configured per class-B CSI process.
    In virtual sectorization scenarios, the multiple CSI-RS resources configured for a CSI-RS resource are indeed co-located, and hence it is not necessary that the UE should derive different Doppler parameters across the different CSI-RS resources. This can significantly save the UE complexity.
    Alternatively, the specification can state that a UE is not expected to be configured with different qcl-CRS-info (i.e., QCL CRS information) across the multiple NZP CSI-RS resources configured for a CSI process when Class-B reporting is configured.
  Alt 3: Total number of qcl-CRS-info (alternatively, qcl-ScramblingIdentity) that can be configured per carrier frequency is up to a constant value, e.g., 3.
    With the maximum total number defined, the UE complexity increase for Doppler parameter estimation can also be limited.
    In other words, the UE is not expected to be configured with more than three different qcl-ScramblingIdentity per carrier frequency.
    In other words, the maximum number of qcl-CRS-info (alternatively, qcl-ScramblingIdentity) that can be configured per carrier frequency is a constant value, e.g., 3.

Figure 8:
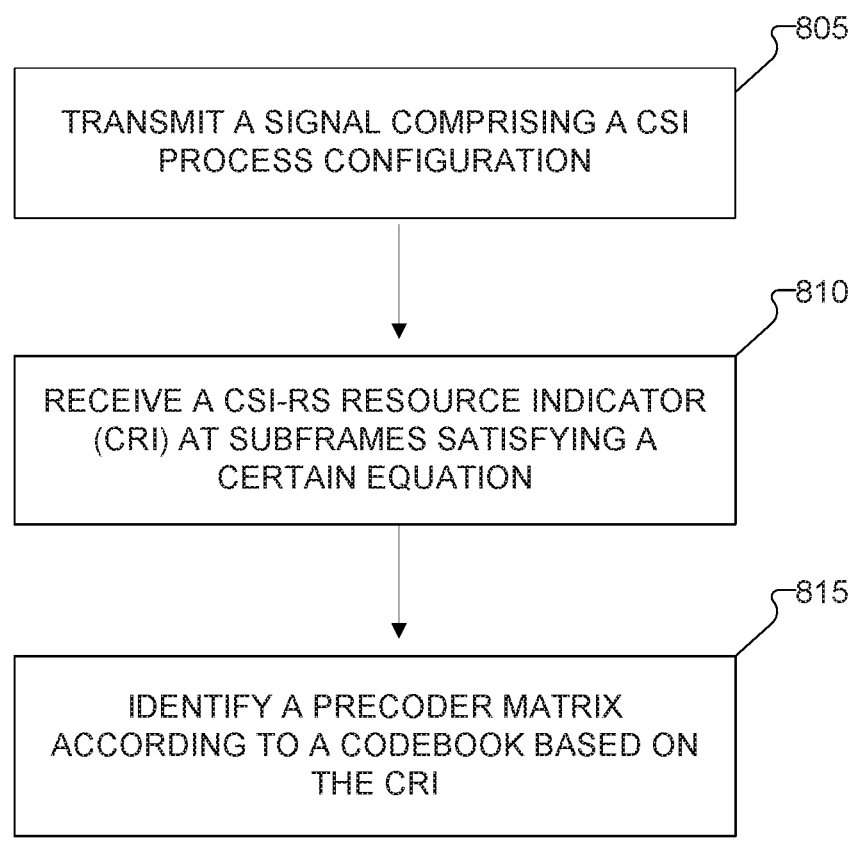
FIG. 8 illustrates a process for communicating with a base station BS in accordance with various embodiments of the present disclosure.

FIG. 8 illustrates a process for communicating with a base station BS in accordance with various embodiments of the present disclosure. Various changes could be made to FIG. 8. For example, while shown as a series of steps, various steps in each figure could overlap, occur in parallel, occur in a different order, occur multiple times, or be omitted in some embodiments. The process depicted in FIG. 8 may be performed by the BS 102 in FIG. 3B.

The process begins with the BS transmitting a signal comprising a CSI process configuration (step 805) In step 805, the CSI process configuration can include a CSI-RS resource configuration to identify a plurality of CSI-RS resources. Each CSI-RS resource can be configured with a number of antenna ports.

The BS then receives a CSI-RS resource indicator (CRI) derived by utilizing the plurality of CSI-RS resources (step 810). In step 805, when the number of antenna ports in each configured CSI-RS resource is one (1), reporting instances for the CRI are subframes satisfying:

$$(10 \times n_f + \lfloor n_s/2 \rfloor - N_{OFFSET,CQI} - N_{OFFSET,CRI}) \mod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer.

In some embodiments, when the number of antenna ports in each configured CSI-RS resource is one (1), only CRI is reported.

In some embodiments, when the UE is configured with a Class B CSI reporting, and a supportedMIMO-CapabilityDL-r10 field is included in a UE-EUTRA-Capability, a maximum number of layers for each CSI process is determined according to a minimum of the maximum of number of antenna port of the configured CSI-RS resources in that CSI process and a maximum of reported UE downlink MIMO capabilities for a same band in a corresponding band combination.

In some embodiments, when the UE is configured with a Class B CSI reporting and a supportedMIMO-CapabilityDL-r10 field is not included in a UE-EUTRA-Capability, a maximum number of layers for each CSI process is determined according to a minimum of a maximum of number of antenna port of the configured CSI-RS resources in that CSI process and ue-Category (without suffix).

Subsequently, the BS identifies a precoder matrix according to a codebook based on the CRI (step 815).

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A user equipment (UE) capable of communicating with a base station (BS), the UE comprising:

a transceiver configured to receive a signal comprising a channel state information (CSI) process configuration, wherein the CSI process configuration comprises a CSI-RS resource configuration to identify a plurality of CSI-RS resources, each CSI-RS resource configured with a number of antenna ports; and a controller configured to derive a CSI-RS resource indicator (CRI) by utilizing the CSI-RS, wherein the transceiver is further configured to report the CRI to the base station, wherein, when the number of antenna ports in each configured CSI-RS resource is one, a reporting interval of the CRI reporting by the transceiver to the base station is an integer multiple $M_{CRI}$ of a period of $N_{pd}$ subframes, with reporting instances for the CRI reporting being subframes satisfying:

$$(10 \times n_f + \lfloor n_s/2 \rfloor - N_{OFFSET,CQI} - N_{OFFSET,CRI}) \mod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer, and wherein otherwise the reporting interval of the CRI reporting by the transceiver to the base station is an integer multiple $M_{RI}$ of a period of $M_{CRI} \cdot N_{pd}$ subframes, with reporting instances for the CRI reporting being subframes satisfying:

$$(10 \times n_f + \lfloor n_s/2 \rfloor - N_{OFFSET,CQI} - N_{OFFSET,RI} - N_{OFFSET,CRI}) \mod (N_{pd} \cdot M_{RI} \cdot M_{CRI}) = 0,$$

where $N_{OFFSET,RI}$ is a positive integer, and $M_{RI}$ is a positive number.

2. The UE of claim 1, wherein the number of antenna ports in each configured CSI-RS resource is one when only CRI is reported.

3. The UE of claim 1, wherein when the UE is configured with a Class B CSI reporting, and a supportedMIMO-CapabilityDL-r10 field is included in a UE-EUTRA-Capability, a maximum number of layers for each CSI process is determined according to a minimum of the maximum of number of antenna port of the configured CSI-RS resources in that CSI process and a maximum of reported UE downlink MIMO capabilities for a same band in a corresponding band combination.

4. The UE of claim 3, wherein when the UE is configured with a Class B CSI reporting and a supportedMIMO-CapabilityDL-r10 field is not included in a UE-EUTRA-Capability, a maximum number of layers for each CSI process is determined according to a minimum of a maximum of number of antenna port of the configured CSI-RS resources in that CSI process and ue-Category (without suffix).

5. The UE of claim 1, wherein the UE configured with a Class B CSI reporting, and with a quasi co-location type B, is not expected to receive CSI-RS resource configurations with different qcl-CRS-Info-r11 for the CSI process.

6. The UE of claim 1, wherein the CRI functions as a beam selection indicator (BI).

7. A user equipment (UE) capable of communicating with a base station (BS), the UE comprising:

a transceiver configured to receive a signal comprising a channel state information (CSI) process configuration, wherein the CSI process configuration comprises a CSI-RS resource configuration to identify a plurality of CSI-RS resources, each CSI-RS resource configured with a number of antenna ports; and a controller configured to derive a rank indicator (RI) by utilizing the CSI-RS, wherein the transceiver is further configured to report the RI to the base station, wherein, when only RI reporting is configured, a reporting interval of the RI reporting by the transceiver to the base station is an integer multiple $M_{RI}$ of a period of $N_{pd}$ subframes, with reporting instances for the RI reporting being subframes satisfying:

$$(10 \times n_f + \lfloor n_s/2 \rfloor - N_{OFFSET,CQI} - N_{OFFSET,RI}) \mod (N_{pd} \cdot M_{RI}) = 0,$$

where $N_{OFFSET,RI}$ is a positive integer, $n_f$ is a radio frame number, $n_s$ is a slot number, and $N_{OFFSET,CQI}$ is a positive integer, and wherein otherwise the reporting interval of the RI reporting by the transceiver to the base station is an integer multiple $M_{CRI}$ of a period of $M_{RI} \cdot N_{pd}$ subframes, with reporting instances for the RI reporting being subframes satisfying:

$$(10 \times n_f + \lfloor n_s/2 \rfloor - N_{OFFSET,CQI} - N_{OFFSET,RI} - N_{OFFSET,CRI}) \mod (N_{pd} \cdot M_{RI} \cdot M_{CRI}) = 0,$$

where $N_{OFFSET,CRI}$ is a positive integer, and $M_{CRI}$ is a positive number.

8. A base station capable of communicating with a user equipment (UE), the base station comprising:
a transmitter configured to transmit a signal comprising a channel state information (CSI) process configuration, wherein the CSI process configuration comprises a CSI-RS resource configuration to identify a plurality of CSI-RS resources, each CSI-RS resource configured with a number of antenna ports;
a receiver configured to receive a CSI-RS resource indicator (CRI) derived by utilizing the plurality of CSI-RS resources; and
a controller configured to identify a precoder matrix according to a codebook based on the CRI,
wherein, when the number of antenna ports in each configured CSI-RS resource is one, a reporting interval of CRI reporting received by the base station is an integer multiple $M_{CRI}$ of a period of $N_{pd}$ subframes, with reporting instances for the CRI reporting being subframes satisfying:

$$(10 \times n_f + \lfloor n_s/2 - N_{OFFSET,CQI} - N_{OFFSET,CRI}) \mod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer, and wherein otherwise the reporting interval of the CRI reporting received by the base station is an integer multiple $M_{RI}$ of a period of $M_{CRI} \cdot N_{pd}$ subframes, with reporting instances for CRI reporting being subframes satisfying:

$$(10 \times n_f + \lfloor n_s/2 \rfloor - N_{OFFSET,CQI} - N_{OFFSET,RI} - N_{OFFSET,CRI}) \mod (N_{pd} \cdot M_{RI} \cdot M_{CRI}) = 0,$$

where $N_{OFFSET,RI}$ is a positive integer, and $M_{RI}$ is a positive number.

9. The BS of claim 8, wherein when the number of antenna ports in each configured CSI-RS resource is one when only the CRI is reported.

10. The BS of claim 8, wherein when the UE is configured with a Class B CSI reporting, and a supportedMIMO-CapabilityDL-r10 field is included in a UE-EUTRA-Capability, a maximum number of layers for each CSI process is determined according to a minimum of the maximum of number of antenna port of the configured CSI-RS resources in that CSI process and a maximum of reported UE downlink MIMO capabilities for a same band in a corresponding band combination.

11. The BS of claim 10, wherein when the UE is configured with a Class B CSI reporting and a supportedMIMO-CapabilityDL-r10 field is not included in a UE-EUTRA-Capability, a maximum number of layers for each CSI process is determined according to a minimum of a maximum of number of antenna port of the configured CSI-RS resources in that CSI process and ue-Category (without suffix).

12. The BS of claim 8, wherein the UE configured with a Class B CSI reporting, and with a quasi co-location type B, is not expected to receive CSI-RS resource configurations with different qcl-CRS-Info-r11 for the CSI process.

13. The BS of claim 8, wherein the CRI functions as a beam selection indicator (BI).

14. A base station (BS) capable of communicating with a user equipment (UE), the BS comprising:
a transmitter configured to transmit a signal comprising a channel state information (CSI) process configuration, wherein the CSI process configuration comprises a CSI-RS resource configuration to identify a plurality of CSI-RS resources, each CSI-RS resource configured with a number of antenna ports;
a receiver configured to receive a rank indicator (RI) derived by utilizing the plurality of CSI-RS resources; and
a controller configured to identify a precoder matrix according to a codebook based on the RI,
wherein, when only RI reporting is configured, a reporting interval of the RI reporting received by the base station is an integer multiple $M_{RI}$ of a period of $N_{pd}$ subframes, with reporting instances for the RI reporting being subframes satisfying:

$$(10 \times n_f + \lfloor n_s/2 \rfloor - N_{OFFSET,CQI} - N_{OFFSET,RI}) \mod (N_{pd} \cdot M_{CRI}) = 0,$$

where $N_{OFFSET,RI}$ is a positive integer, $n_f$ is a radio frame number, $n_s$ is a slot number, and $N_{OFFSET,CQI}$ is a positive integer, and wherein otherwise the reporting interval of the RI reporting received by the base station is an integer multiple $M_{CRI}$ of a period of $M_{RI} \cdot N_{pd}$ subframes, with the reporting instances for the RI reporting being subframes satisfying:

$$(10 \times n_f + \lfloor n_s/2 \rfloor - N_{OFFSET,CQI} - N_{OFFSET,RI} - N_{OFFSET,CRI}) \mod (N_{pd} \cdot M_{RI} \cdot M_{CRI}) = 0,$$

where $N_{OFFSET,CRI}$ is a positive integer, and $M_{CRI}$ is a positive number.

15. Presented) A method for communicating with a user equipment (UE), the method comprising:
transmitting a signal comprising a channel state information (CSI) process configuration, wherein the CSI process configuration comprises a CSI-RS resource configuration to identify a plurality of CSI-RS resources, each CSI-RS resource configured with a number of antenna ports;
receiving a CSI-RS resource indicator (CRI) derived by utilizing the plurality of CSI-RS resources; and
identifying a precoder matrix according to a codebook based on the CRI,
wherein, when the number of antenna ports in each configured CSI-RS resource is one, a reporting interval of CRI reporting received by the base station is an integer multiple $M_{CRI}$ of a period of $N_{pd}$ subframes, with reporting instances for the CRI reporting being subframes satisfying:

$$(10 \times n_f + \lfloor n_s/2 \rfloor - N_{OFFSET,CQI} - N_{OFFSET,CRI}) \bmod (N_{pd} \cdot M_{CRI}) = 0,$$

where $n_f$ is a radio frame number, $n_s$ is a slot number, $N_{OFFSET,CQI}$ is a positive integer, and $N_{OFFSET,CRI}$ is a positive integer, and wherein otherwise the reporting interval of the CRI reporting received the base station is an integer multiple $M_{RI}$ of a period of $M_{CRI} \cdot N_{pd}$ subframes, with reporting instances for CRI reporting being subframes satisfying:

$$(10 \times n_f + \lfloor n_s/2 \rfloor - N_{OFFSET,CQI} - N_{OFFSET,RI} - N_{OFFSET,CRI}) \bmod (N_{pd} \cdot M_{RI} \cdot M_{CRI}) = 0,$$

where $N_{OFFSET,RI}$ is a positive integer, and $M_{RI}$ is a positive number.

16. The method of claim 15, wherein when the number of antenna ports in each configured CSI-RS resource is one when only the CRI is reported.

17. The method of claim 15, wherein when the UE is configured with a Class B CSI reporting, and a supported-MIMO-CapabilityDL-r10 field is included in a UE-EUTRA-Capability, a maximum number of layers for each CSI process is determined according to a minimum of the maximum of number of antenna port of the configured CSI-RS resources in that CSI process and a maximum of reported UE downlink MIMO capabilities for a same band in a corresponding band combination.

18. The method of claim 17, wherein when the UE is configured with a Class B CSI reporting and a supported-MIMO-CapabilityDL-r10 field is not included in a UE-EUTRA-Capability, a maximum number of layers for each CSI process is determined according to a minimum of a maximum of number of antenna port of the configured CSI-RS resources in that CSI process and ue-Category (without suffix).

19. The method of claim 15, wherein the UE configured with a Class B CSI reporting, and with a quasi co-location type B, is not expected to receive CSI-RS resource configurations with different qcl-CRS-Info-r11 for the CSI process.

20. A method for communicating with a user equipment (UE), the method comprising:

transmitting a signal comprising a channel state information (CSI) process configuration, wherein the CSI process configuration comprises a CSI-RS resource configuration to identify a plurality of CSI-RS resources, each CSI-RS resource configured with a number of antenna ports;

receiving a rank indicator (RI) derived by utilizing the plurality of CSI-RS resources; and identifying a precoder matrix according to a codebook based on the RI, wherein, when only RI reporting is configured, a reporting interval of the RI reporting received by the base station is an integer multiple $M_{RI}$ of a period of $N_{pd}$ subframes, with reporting instances for the RI reporting being subframes satisfying:

$$(10 \times n_f + \lfloor n_s/2 \rfloor - N_{OFFSET,CQI} - N_{OFFSET,RI}) \bmod (N_{pd} \cdot M_{CRI}) = 0,$$

where $N_{OFFSET,RI}$ is a positive integer, $n_f$ is a radio frame number, $n_s$ is a slot number, and $N_{OFFSET,CQI}$ is a positive integer, and wherein otherwise the reporting interval of the RI reporting received by the base station is an integer multiple $M_{CRI}$ of a period of $M_{RI} \cdot N_{pd}$ subframes, with the reporting instances for the RI reporting being subframes satisfying:

$$(10 \times n_f + \lfloor n_s/2 \rfloor - N_{OFFSET,CQI} - N_{OFFSET,RI} - N_{OFFSET,CRI}) \bmod (N_{pd} \cdot M_{RI} \cdot M_{CRI}) = 0,$$

where $N_{OFFSET,CRI}$ is a positive integer, and $M_{CRI}$ is a positive number.

* * * * *